(12) United States Patent
Yin et al.

(10) Patent No.: US 8,456,556 B2
(45) Date of Patent: Jun. 4, 2013

(54) SENSING PIXEL ARRAYS AND SENSING DEVICES USING THE SAME

(75) Inventors: Ping-Hung Yin, Grand Cayman (KY); Shuenn-Ren Hsiao, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 179 days.

(21) Appl. No.: 13/010,470

(22) Filed: Jan. 20, 2011

(65) Prior Publication Data

US 2012/0188429 A1    Jul. 26, 2012

(51) Int. Cl.
*H04N 3/14* (2006.01)
(52) U.S. Cl.
USPC .......................................... 348/297; 348/302
(58) Field of Classification Search
USPC ................ 348/294, 296, 297, 300–309
See application file for complete search history.

(56) References Cited

U.S. PATENT DOCUMENTS

2006/0114345 A1*  6/2006  Wu et al. ...................... 348/308
2008/0001802 A1*  1/2008  Higuchi ........................ 341/155

* cited by examiner

*Primary Examiner* — Sinh Tran
*Assistant Examiner* — Mark Monk
(74) *Attorney, Agent, or Firm* — McClure, Qualey & Rodack, LLP

(57) ABSTRACT

A sensing pixel array is provided and includes a plurality of pixels disposed in an array. Each pixel operates during an exposure period and a readout period and generates a readout signal. Each pixel includes a sensing unit and a sampling unit. The sensing unit senses light to generate a sensing signal during the exposure period. The sampling unit samples the sensing signal to generate a sensing output signal which serves as the readout signal during the readout period. During the exposure period, the sampling unit acts as a memory unit for storing an input signal and outputting an accessed output signal which serves as the readout signal.

15 Claims, 3 Drawing Sheets

SENSING PIXEL ARRAYS AND SENSING DEVICES USING THE SAME

BACKGROUND OF THE INVENTION

1. Field of the Invention

The invention relates to a sensing pixel array, and more particularly, to a sensing device having a sensing pixel array with a sensing function and a memorizing function.

2. Description of the Related Art

Generally, a CMOS image sensor (CIS) is more highly integrated than that of a CCD image sensor. Thus, a CIS can be embedded with an image signal processor (ISP) circuit on one chip, to perform better image processing. Image quality normally depends on the number of line buffers. Accordingly, a CIS with high image quality requires an increased number of line buffers. However, a large number of line buffers results in higher costs of the CIS and occupies a larger area in the CIS.

Thus, it is desired to provide a sensing device having a pixel array with a sensing function and a memorizing function for reducing the number of line buffers therein.

BRIEF SUMMARY OF THE INVENTION

An exemplary embodiment of a sensing pixel array comprises a plurality of pixels disposed in an array. Each pixel operates during an exposure period and a readout period and generates a readout signal. Each pixel comprises a sensing unit and a sampling unit. The sensing unit senses light to generate a sensing signal during the exposure period. The sampling unit samples the sensing signal to generate a sensing output signal which serves as the readout signal during the readout period. During the exposure period, the sampling unit acts as a memory unit for storing an input signal and outputting an accessed output signal which serves as the readout signal.

An exemplary embodiment of a sensing device comprises a plurality of pixels, a first decoding circuit, and a second decoding circuit. The pixels are disposed in an array. Each pixel operates within an exposure period and a readout period and generates a readout signal. Each pixel comprises a sensing unit and a sampling unit. The sensing unit senses light to generate a sensing signal during the exposure period. The sampling unit samples the sensing signal to generate a sensing output signal which serves as the readout signal during the readout period. During the exposure period, the sampling unit acts as a memory unit for storing an input signal and outputting an accessed output signal which serves as the readout signal. The first decoding circuit is used to control the sampling unit to sample the sensing signal and generate the sensing output signal during the readout period. The second decoding circuit is used to control the sampling unit to store the input signal and output the accessed output signal during the exposure period.

In some embodiments, the sensing device further comprises a readout circuit for reading the readout signal from the sampling unit and processing the readout signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
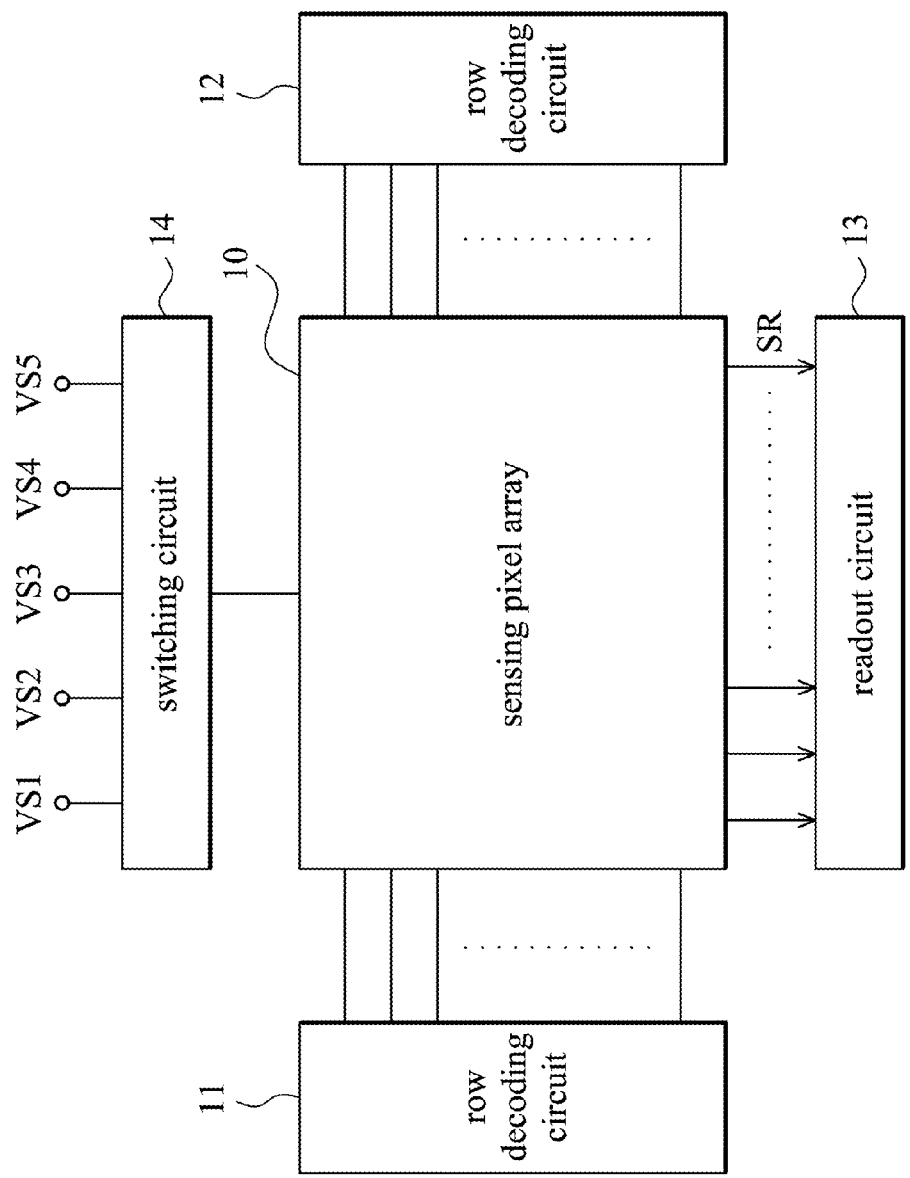
FIG. 1 shows an exemplary embodiment of a sensing device.

FIG. 1 shows an exemplary embodiment of a sensing device. Referring to FIG. 1, a sensing device 1 comprises a sensing pixel array 10, row decoding circuits 11 and 12, a readout circuit 13, and a switching circuit 14. The sensing pixel array 10 comprises a plurality of pixels (shown in FIG. 2) which are disposed in rows and columns of an array. Each of the pixels can operate in an exposure period and a readout period and generate a readout signal SR. The decoding circuits 11 and 12 are used to control the pixels of the sensing pixel array 10 to generate the readout signals SR. The readout circuit 13 is used to read the readout signals SR from the sensing pixel array 10. The switching circuit 14 is coupled to a plurality of voltage sources. In the embodiment, five voltage sources VS1-VS5 are given as an example, and the voltage sources VS1-VS5 provides voltages AVDD, AVDD*3/4, AVDD*2/4, AVDD*1/4, and AGND (ground) respectively. The switching circuit 14 is used to selectively transmit one of the voltages of the voltage source VS1-VS5 to the sensing pixel array 10.

Figure 2:
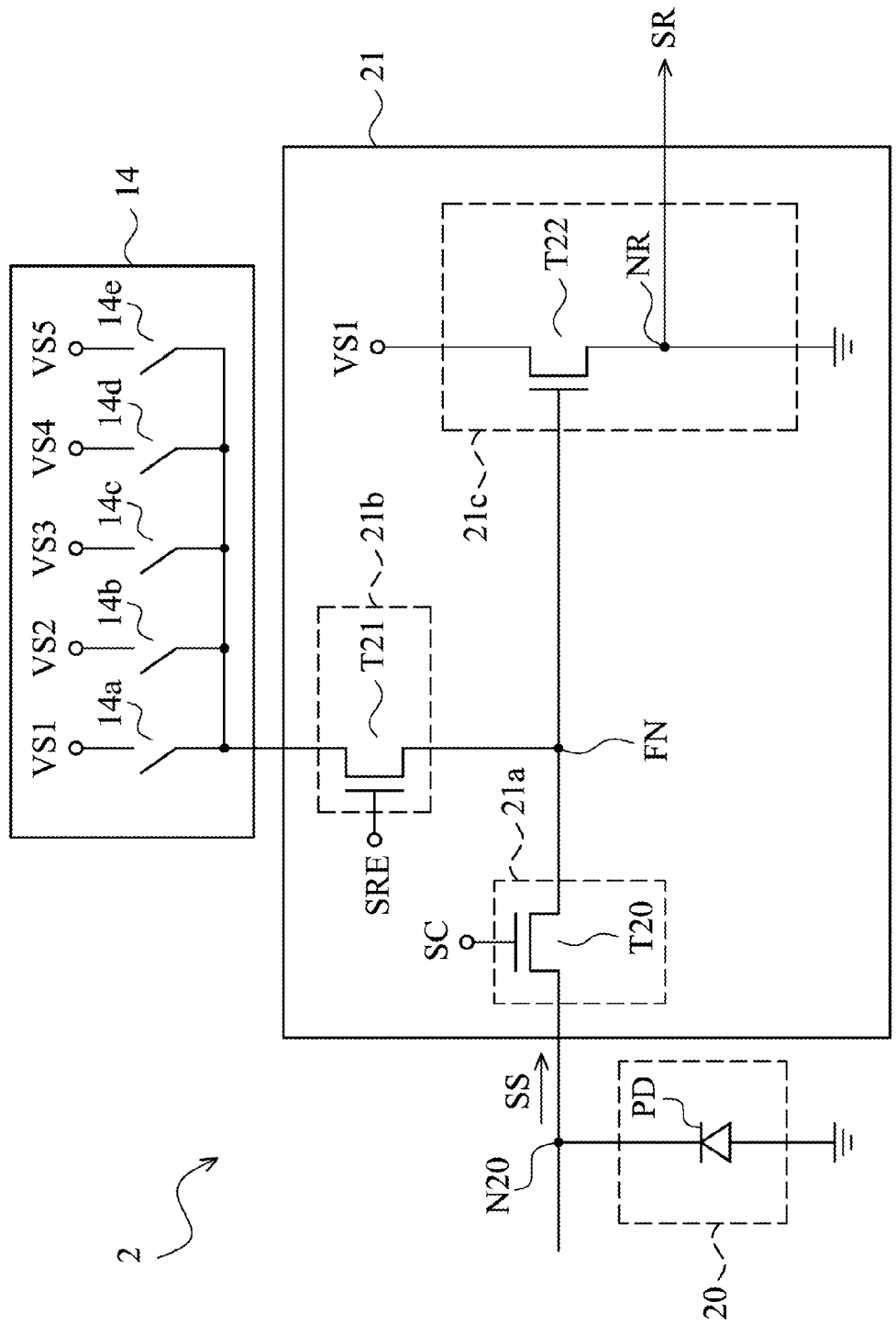
FIG. 2 shows an exemplary embodiment of a pixel.

FIG. 2 shows an exemplary embodiment of each pixel of the sensing pixel array 10. In FIG. 2, one pixel of the sensing pixel array 10 is given as an example. The other pixels have the same structure as the pixel in FIG. 2. For a clearer description, FIG. 2 also shows the switching circuit 14. The switching circuit 14 comprises switches 14a-14e coupled between the voltage sources VS1-VS5 and the pixel 2, respectively. Referring to FIG. 2, a pixel 2 comprises a sensing unit 20 and a sampling unit 21. The sensing unit 20 senses light to generate a sensing signal SS during the exposure period. In the embodiment, the sensing unit 20 comprises a photo diode PD having a cathode coupled to a node N20 and an anode coupled to the ground (such as the voltage source VS5). The photo diode PD senses light to generate the sensing signal SS during the exposure period. During the readout period, the sampling unit 21 is used to sample the sensing signal SS to generate a sensing output signal which serves as the readout signal SR. During the exposure period, the sampling unit 21 acts as a memory unit for storing an input signal and outputting an accessed output signal which serves as the readout signal SR.

Referring to FIG. 2 the sampling unit 21 comprises a transfer element 21a, a reset element 21b, and a source follower 21c. In the embodiment, the transfer element 21a comprises a transistor T20 having a control terminal receiving a control signal SC, an input terminal coupled to the sensing unit 20 at the node N20, and an output terminal coupled to a floating diffusion node FN. The reset element 21b comprises a transistor T21 having a control terminal receiving a reset signal SRE, an input terminal coupled to the switching circuit 14, and an output terminal coupled to the floating diffusion node FN. The source follower 21c comprises a transistor T22. The transistor T22 has a control terminal coupled to the floating diffusion node FN, an input terminal coupled to the voltage source VS1 (AVDD), and an output terminal coupled to a readout node NR. In the embodiment, the floating diffusion node FN can store charges. In other embodiments, there is a storage element coupled between the floating diffusion node FN and the ground, and the storage element stores charges instead of the floating diffusion node FN. The storage element can be a substantial capacitor or be a parasitical capacitor of the transistor T22 of the source follower 21c.

Figure 3:
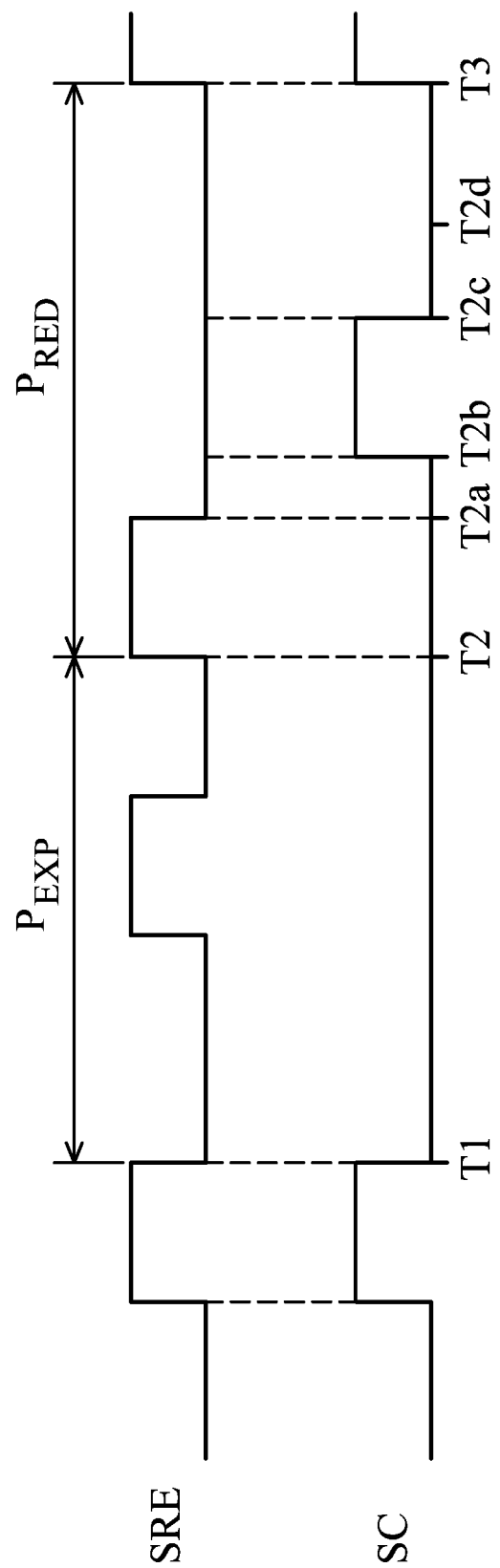
FIG. 3 shows a timing chart of the control signal and the reset signal in FIG. 2.

FIG. 3 shows a timing chart of the control signal SC and the reset signal SRE in FIG. 2. In the following, the operation of the pixel 2 will be described in reference to FIGS. 1-3. The exposure period $P_{EXP}$ starts at time point T1 and ends at time point T2, and the readout period $P_{RED}$ starts at time point T2 and ends at time point T3. Before the exposure period $P_{EXP}$, one of the switches 14a-14e of the switching circuit 14 is turned on, such as the switch 14d, and the corresponding voltage AVDD*1/4 is provided to the input terminal of the transistor T21. At the same time, the decoding unit 11 asserts the reset signal SRE to turn on the transistor T21 and also asserts the control signal SC to turn on the transistor T20. Accordingly, the transistor T21 transmits the received voltage AVDD*1/4 to its output terminal to reset the level of the floating diffusion node FN. Thus, the floating diffusion node FN is at a basis level for a subsequent operation during the readout period $P_{RED}$. Moreover, due to the turned-on transistor T20, the charges at the cathode of the photo diode PD are refreshed.

At time point T1, the decoding unit 11 de-asserts the reset signal SRE to turn off the transistor T21 and also de-asserts the control signal SC to turn off the transistor T20. During the exposure period $P_{EXP}$, the photo diode PD senses light and accumulates charges at its cathode according to the sensed light intensity. The voltage at the cathode of the photo diode PD is referred to as the sensing signal SS.

In the embodiment, if a request is made for the pixel 2 to act as a memory cell, the following operation is performed. During the exposure period $P_{EXP}$, the decoding circuit 12 controls one of the switches 14a-14e of the switching circuit 14, such as the switch 14b, is turned on, and the voltage AVDD*3/4 is provided to the input terminal of the transistor T21 and serves as the input signal. At the same time, the decoding circuit 12 asserts the reset signal SRE to turn on the transistor T21. The transistor T21 transmits the input signal to its output terminal (that is the floating diffusion node FN) for storing the voltage of the input signal in the floating diffusion node FN. Thus, the pixel 2 acts as a memory cell to memorize the input signal. Moreover, the transistor T22 of the source follower 21c is turned on or off according to the voltage of the input signal (that is the voltage at the floating diffusion node FN). Accordingly, the accessed output signal is generated at the readout node NR in response to the turned-on or turned-off state of the transistor T22 to serve as the readout signal SR. Note that, before the readout period $P_{RED}$, the readout circuit 13 has to read the readout signal SR from the readout node NR of the sampling unit 21 and processes the readout signal SR.

Next, the operation during the readout period $P_{RED}$ will be described. At time point T2, the decoding unit 11 asserts the reset signal SRE again to turn on the transistor T21, and the turned-on transistor T21 transmits the received voltage AVDD*1/4 to its output terminal again to reset the level of the floating diffusion node FN. Then, the decoding unit 11 de-asserts the reset signal SRE to turn off the transistor T21 at time point T2a. At time point T2b, the decoding unit 11 asserts the control signal SC to turn on the transistor T20. Thus, the transistor T20 transfers the sensing signal SS generated during the exposure period $P_{EXP}$ to the floating diffusion node FN. In other words, the sensing signal SS is sampled by the sampling unit 21. The voltage of the sensing signal SS is stored in the floating diffusion node FN. At time point T2c, the decoding unit 11 de-asserts the control signal SC to turn off the transistor T20. The transistor T22 of the source follower 21c is turned on or off according to the voltage of the sensing signal SS (that is the voltage at the floating diffusion node FN). Accordingly, the sensing output signal is generated at the readout node NR in response to the turned-on or turned-off state of the transistor T22 to serve as the readout signal SR which represents the light intensity sensed by the photo diode PD. At time point T2d, the readout circuit 13 reads/samples the readout signal SR from the readout node NR of the sampling unit 21 and processes the readout signal SR.

According to the above embodiment, the pixel 2 can serve as a sensing cell for sensing light or serve as a memory cell for storing the input signal which indicates data required for the sensing operation, such as reference information or correction information. During the exposure period $P_{EXP}$, the floating diffusion node FN is not affected by the sensing signal SS at the node N20 due to the turned-off transistor T20. Thus, during the exposure period $P_{EXP}$, the pixel 2 acts as a memory unit to transmit the input signal to the floating diffusion node FN for storage and outputs the accessed output signal according to the input signal to serve as the readout signal SR. Thus, the sensing device 1 requires less line buffers, thereby reducing cost and decreasing area of the sensing device 1.

As shown in FIG. 2, the source follower 21c of each pixel comprises one transistor T22. In some embodiments, the source followers 21c of the pixels in the same column share one current source which is coupled between the respective readout nodes NR of the pixels in the same column and the ground.

In the embodiment of FIG. 3, during the readout period $P_{RED}$, the readout circuit 13 reads the readout signal SR from the readout node NR of the source follower 21c once. That is, the readout circuit 13 reads the readout signal SR from the readout node NR of the source follower 21c at time point T2d. However, in other embodiments, a correlated double sampling (CDS) operation can be performed during the readout period $P_{RED}$. In this case, the readout circuit 13 reads or samples the readout signal SR from the readout node NR of the source follower 21c at the time point between the time points T2a and T2b to obtain one readout voltage and samples the readout signal SR at time point T2d to obtain the other readout voltage. Then, the readout circuit 13 calculates the difference between the two readout voltages, and the voltage difference represents the light intensity sensed by the photo diode PD.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for a sensing pixel array comprising a plurality of pixels disposed in an array, wherein each pixel operates during an exposure period and a readout period and generates a readout signal, wherein the method comprises:

for sensing light to generate a sensing signal during the exposure period by a sensing unit;

and for receiving a reset signal by a sampling unit, wherein after a floating diffusion node in the sampling unit is reset according to the reset signal, the corresponding pixel operates during the exposure period and the readout period, wherein during the readout period, the sampling unit operates according to a third pulse of the reset signal and samples the sensing signal to generate a sensing output signal to serve as the readout signal, wherein during the exposure period, the sampling unit acts as a memory unit for storing an input signal according to a second pulse of the reset signal and outputting an accessed output signal to serve as the readout signal.

2. The method for a sensing pixel array as claimed in claim 1, wherein the sampling unit comprises:

a transfer element, coupled to the sensing unit, for transferring the sensing signal to the floating diffusion node during the readout period;

a reset element, coupled to the floating diffusion node, for resetting a level of the floating diffusion node according to a first pulse of the reset signal before the exposure period;

and a source follower, coupled to the floating diffusion node, for generating the sensing output signal according to a voltage of the sensing signal to serve as the readout signal during the readout period, wherein, during the exposure period, the transfer element does not transfer the sensing signal to the floating diffusion node, and the reset element transmits the input signal to the floating diffusion node according to the second pulse of the reset signal.

3. The method for a sensing pixel array as claimed in claim 2, wherein during the exposure period, the source follower generates the accessed output signal according to a voltage of the input signal to serve as the readout signal.

4. The method for a sensing pixel array as claimed in claim 2, wherein the reset element comprises:

a transistor having a control terminal receiving the reset signal, an input terminal coupled to a plurality of voltage sources and an output terminal coupled to the floating diffusion node, wherein before the exposure period, the input terminal receives a voltage from one of the voltage sources, and the received voltage is transmitted to the output terminal according to the first pulse of the reset signal to reset the level of the floating diffusion node, and wherein during the exposure period, the input terminal receives a voltage from one of the voltage sources according to the second pulse of the reset signal to serve as the input signal, and the input signal is transmitted to the output terminal.

5. The method for a sensing pixel array as claimed in claim 2, wherein the sampling unit further comprises a storage element coupled to the floating diffusion node.

6. The method for a sensing pixel array as claimed in claim 5, wherein the storage element is a substantial capacitor or a parasitical capacitor of the source follower.

7. The method for a sensing pixel array as claimed in claim 1, wherein the sensing unit comprises a photo diode for sensing light to generate the sensing signal during the exposure period.

8. A method for a sensing device comprising a plurality of pixels disposed in an array, wherein each pixel operates in an exposure period and a readout period and generates a readout signal, wherein the method comprises:

for sensing light to generate a sensing signal during the exposure period by a sensing unit;

and for receiving a reset signal by a sampling unit, wherein after a floating diffusion node in the sampling unit is reset according to the reset signal, the corresponding pixel operates during the exposure period and the readout period, wherein during the readout period, the sampling unit operates according to a third pulse of the reset signal and samples the sensing signal to generate a sensing output signal to serve as the readout signal, wherein during the exposure period, the sampling unit acts as a memory unit for storing an input signal according to a second pulse of the reset signal and outputting an accessed output signal to serve as the readout signal;

a first decoding circuit for controlling the sampling unit to sample the sensing signal and generate the sensing output signal through the third pulse of the reset signal during the readout period;

and a second decoding circuit for controlling the sampling unit to store the input signal through the second pulse of the reset signal and output the accessed output signal during the exposure period.

9. The method for a sensing device as claimed in claim 8 further comprising a readout circuit for reading the readout signal from the sampling unit and processing the readout signal.

10. The method for a sensing device as claimed in claim 8, wherein the sampling unit comprises:

a transfer element coupled to the sensing unit and controlled by the first decoding circuit to transfer the sensing signal to the floating diffusion node during the readout period;

a reset element coupled to the transfer element at the floating diffusion node and controlled by a first pulse of the reset signal to reset a level of the floating diffusion node before the exposure period;

and a source follower, coupled to the floating diffusion node, for generating the sensing output signal according to a voltage of the sensing signal to serve as the readout signal during the readout period, wherein, during the exposure period, the first decoding circuit controls the transfer element to not transfer the sensing signal to the floating diffusion node, and the second decoding circuit controls the reset element to transmit the input signal to the floating diffusion node through the second pulse of the reset signal.

11. The method for a sensing device as claimed in claim 10, wherein during the exposure period, the source follower generates the accessed output signal according to a voltage of the input signal to serve as the readout signal.

12. The method for a sensing device as claimed in claim 10, wherein the reset element comprises:

a transistor having a control terminal receiving the reset signal, an input terminal coupled to a plurality of voltage sources, and an output terminal coupled to the floating diffusion node, wherein before the exposure period, the input terminal receives a voltage from one of the voltage sources, and the first decoding circuit asserts the reset signal to have the first pulse for controlling the transistor to transmit the received voltage to the output terminal to reset the level of the floating diffusion node, and wherein during the exposure period, the input terminal receives a voltage from one of the voltage sources to serve as the input signal, and the second decoding circuit asserts the reset signal to have the second pulse for controlling the transistor to transmit the input signal to the output terminal.

13. The method for a sensing device as claimed in claim 10, wherein the sampling unit further comprises a storage element coupled to the floating diffusion node.

14. The method for a sensing device as claimed in claim 13, wherein the storage element is a substantial capacitor or a parasitical capacitor of the source follower.

15. The method for a sensing device as claimed in claim 8, wherein the sensing unit comprises a photo diode for sensing light to generate the sensing signal during the exposure period.

* * * * *